Oct. 13, 1942.   W. T. MARCHMENT   2,298,954
ELECTRICAL LIQUID-LEVEL INDICATOR
Filed June 2, 1941   2 Sheets-Sheet 1
Fig.1.
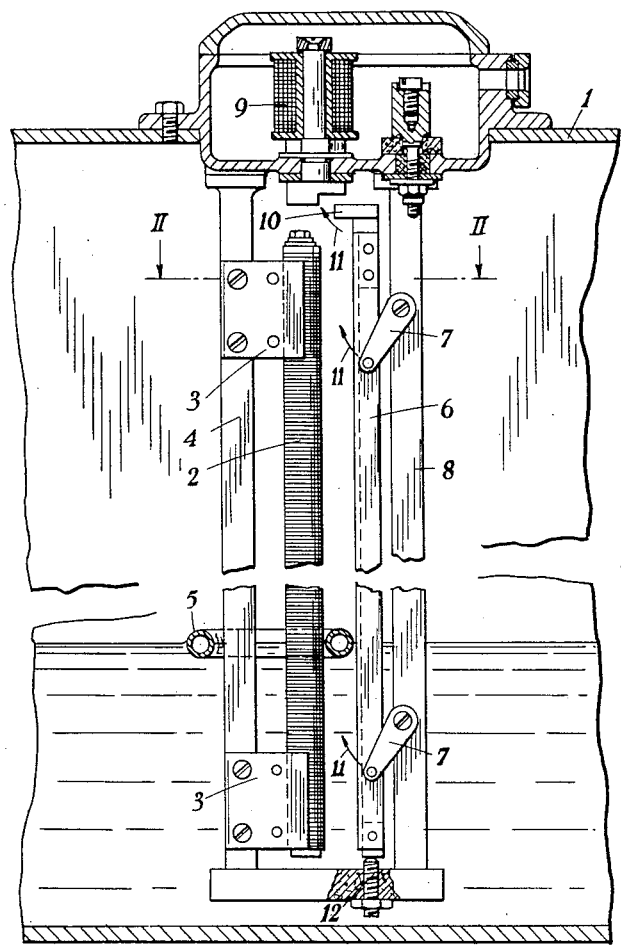
INSULATOR RING WITH METALLIZED SURFACE
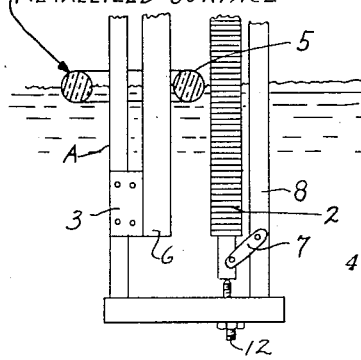
Fig.8.
Fig.2.
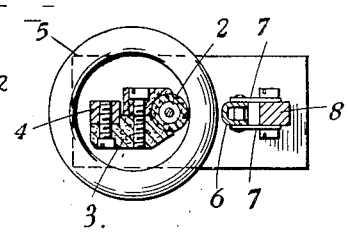
INVENTOR.
William Thomas Marchment
BY Ralph B. Stewart
ATTORNEY.

Oct. 13, 1942.   W. T. MARCHMENT   2,298,954
ELECTRICAL LIQUID-LEVEL INDICATOR
Filed June 2, 1941   2 Sheets-Sheet 2
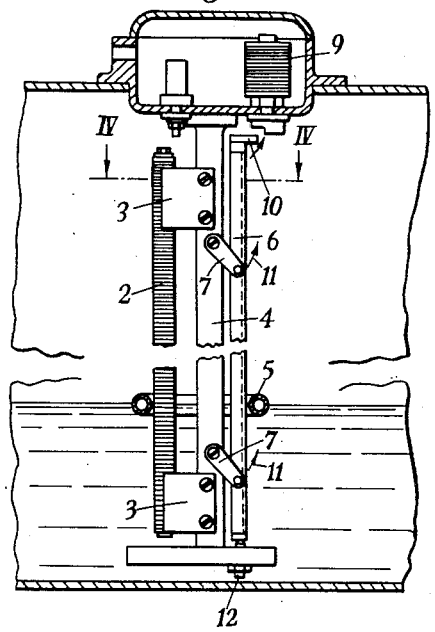
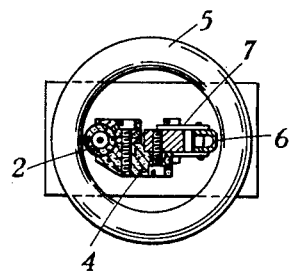
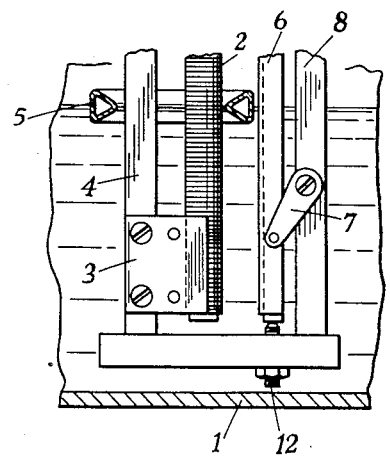
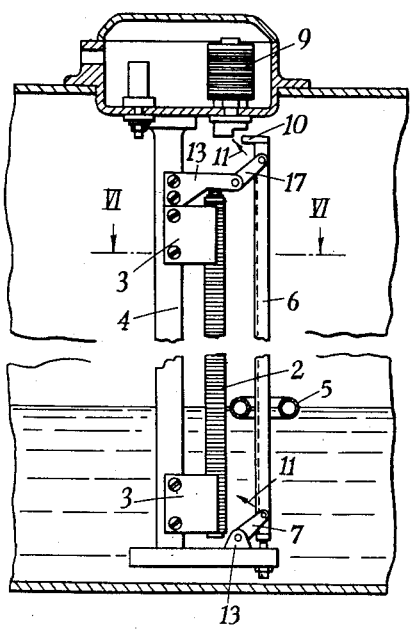
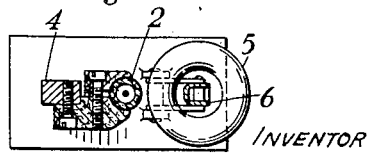
INVENTOR
William Thomas Marchment
BY
Ralph B. Stewart
ATTORNEY Patented Oct. 13, 1942

2,298,954

UNITED STATES PATENT OFFICE 2,298,954

ELECTRICAL LIQUID-LEVEL INDICATOR

William Thomas Marchment, London, England

Application June 2, 1941, Serial No. 396,353
In Great Britain July 8, 1940

6 Claims. (Cl. 73—308)

This invention relates to electrical liquid-level indicators such as are used in liquid storage tanks and particularly in the gasoline tanks of aircraft and other motor vehicles.

The invention in some aspects is a development of that forming the subject of my application Serial No. 254,940, filed February 6, 1939, now Patent No. 2,260,913. It aims at extending the application of the "free-float" principal underlying my prior invention and at providing a simplified form of apparatus. The disclosure of my said application contemplates an apparatus comprising a spherical float arranged to rise and fall freely with the liquid level within a tank, a vertical cage or guide structure to control the movement of the float between the highest and lowest liquid levels to be measured; a resistance element mounted vertically in the tank to extend along the path of the float in its rising and falling movement, and a pivoted clamping member provided for moving the float laterally across the surface of the liquid and clamping it against the resistance element when a reading is to be taken. The amount of resistance which is included by the float contact in the circuit of an indicating instrument is governed by the height of the float, and consequently by the level of the liquid so that a reading of such resistance can be calibrated in terms of the height of the liquid surface. The arrangement has, among other advantages, the great advantages that the float is entirely free and untrammelled up to the moment when it is temporarily clamped against the resistance element to take a reading, and also that the operator, on taking his reading, can observe by movement of the indicating instrument that the indicating apparatus is in working order.

Owing to the fact that except when a reading is being taken, the float is free to rise and fall and has no attachment which would increase its inertia, it is obviously necessary to retain it in the neighbourhood of the resistance element so that it can immediately be clamped against the latter when it is desired to take a reading. It is for this purpose that the guide structure was to be provided so as to permit adequate freedom of movement of the float while serving to retain it in a position in which it can quickly be caused to co-operate with the resistance element.

In accordance with the present invention, in such an indicating apparatus having a freely rising and falling float and a resistance element extending along the path of movement of the float between its highest and lowest positions, and a clamping member for bringing the float and resistance element into contact with one another, the float is shaped to encircle at least the resistance element itself, or a vertical member which is parallel to the resistance element so that the latter or the vertical member serves to guide the float. Thus, the float is of ring shape and the ring may be toroidal, or, in fact, of any convenient cross-section such as a cross-section approximating to a triangle, and therefore, it can be adequately guided without being confined within any guide structure. In one form of construction the float encircles the resistance element but not the clamping member, in which case the latter, when a reading is to be taken, is arranged to press on the outside of the float so that the latter makes contact at the inner periphery of the ring section with the resistance element. Alternatively, however, the float may encircle both the resistance element and the clamping member, in which event when a reading is to be taken, the clamping member presses on the inside of the float and draws the latter into contact with the resistance element.

It is still, of course, an advantage to make the float as light as possible to make its inertia low, and therefore in practice it may be a hollow ring of thin metal or of electrical insulating material with a metallised coating.

Some embodiments of the present invention suitable for use with gasoline or oil tanks of aircraft will now be more fully described, reference being had to the annexed drawings, in which:

Figure 1 is an elevation partly in section of the apparatus according to one form of construction which is fitted in the gasoline or oil tank;

Figure 2 is a horizontal cross-section on the line II—II in Figure 1;

Figure 3 is a view similar to Figure 1 showing a modified construction;

Figure 4 is a horizontal cross-section on the line IV—IV in Figure 3;

Figure 5 is an elevation similar to Figures 1 and 3 of a third form of construction; and Figure 6 is a horizontal cross-section on the line VI—VI in Figure 5; while Figure 7 is an elevation corresponding to the lower part of Figure 1 but in which a float of modified cross-section is shown.

Figure 8 is a fragmentary showing of a modified construction of Figure 1.

In the form of construction shown in Figures 1 and 2, the device extends substantially between the top and bottom of a tank 1 which may be assumed to be the gasoline tank of an aeroplane.

The resistance element 2 is supported by bracket plates 3 from a pillar 4 which extends from the top of the tank almost to the bottom.

The clamping member 6 is a vertical bar which, in the position shown in Figure 1, is clear of the float 5, so that the latter can rise and fall freely with the liquid level. The bar 6 is pivoted to parallel motion links 7 which swing about pivots on a second vertical pillar 8. The clamping member 6 is operated as described in the specification of my Patent No. 2,260,913 by an electromagnet 9 which may be connected in circuit as shown and described in the said prior patent specification. When it is energized, it attracts its armature 10 carried by the clamping bar 6, so that the latter swings up as indicated by the arrows 11 and firmly clamps the float 5 against the resistance element 2 so that a reading can be taken. When the magnet 9 is de-energized, the clamping member 6 subsides under its own weight into the position shown in Figure 1 and rests on a stop screw 12.

As can readily be seen, the float is a toroidal ring made hollow and of thin metal. It encircles the resistance element 2 and the pillar 4, and except when a reading is being taken, is clear of both of them so that it can rise and fall freely with the liquid in the tank.

The form shown in Figures 3 and 4 is similar and the same reference numerals have been applied. In this case, however, there is a single fixed vertical pillar 4 which lies between the resistance element 2 and the clamping bar 6. The float 5 in this form is made to encircle the resistance element 2 and the clamping bar 6, and the latter is mounted so that when the electromagnet 9 attracts its armature 10, the clamping bar 6 swings outwards with the links 7, as shown by the arrows 11, pressing on the inner periphery of the float 5 and drawing it against the outer surface of the resistance element 2 for taking a reading.

In the further variant shown in Figures 5 and 6, the same reference numerals have been used again, and while a single pillar 4 is used, the clamping bar 6 has its links 7 pivoted to brackets 13 extending from the pillar 4. The float 5 in this case encircles only the clamping bar 6 so that when the electromagnet 9 is energized and attracts its armature 10 causing the clamping bar 6 to swing upwards as shown by the arrows 11, the float 5 is pinched at one point between the clamping bar 6 and the resistance element 2 to enable a reading to be taken.

In Figure 7, the same general arrangement is shown as in Figure 1, but in this case the float 5 is shown as a hollow ring having a cross-section which is a triangle with rounded corners. When the clamping bar 6 swings up to clamp the float 5 against the resistance element 2, the inner edge formed by the apex of the triangular cross-section comes into contact with the resistance element.

It will be realised that in any of the arrangements described above, a similar result may be obtained by arranging the resistance element itself to serve as the clamping member, and the clamping member to serve as a fixed abutment, the resistance element being mounted so that it can be moved to clamp the float. For example, in Figure 8 I have shown a modified construction of Figure 1 in which clamp 6 and resistor 2 are reversed in position, clamp 6 being fixed and resistor 2 being mounted for movement on the ends of links 7.

The resistance element may be wound on a tube of insulating material and itself may consist of wire of nickel chromium alloy insulated by an oxide coating. This enables the wire to be closely wound with adjacent turns in contact but the coating must be cleaned off along the line at which the float 5 is to be brought into contact with it. Bare or uninsulated wire may be used, but then the adjacent turns must be spaced apart. However, in some circumstances, this is an advantage since the spacing need not be entirely regular and allows for any desired law between the change in resistance and the amount of rise or fall of the float.

The latter may be hollow and made of metal or, as already indicated, it may be composed of electrical insulating material such as wood or cork furnished with a metallised surface. In all cases, the float itself forms part of the circuit to the indicating or measuring instrument, of which the actual connections are exactly as disclosed in my Patent No. 2,260,913.

I claim:

1. An electrical liquid-level indicator, comprising in combination, a resistor mounted so as to extend between the highest and lowest levels to be indicated, a clamping member mounted adjacent and parallel to said resistor, an annular float having an electrically-conducting surface and encircling at least one of the members comprising said resistor and said clamping member so as to be freely guided thereby during its rising and falling movements in accordance with the liquid level, and means for effecting relative transverse movement between said resistor and said clamping member and thereby bringing said float into electrical contact with said resistor at a point corresponding to the existing liquid level.

2. An electrical indicator for the level of a liquid in a container, comprising in combination, a resistor fixed in said container so as to extend between the highest and lowest levels to be indicated, a clamping member mounted adjacent and parallel to said resistor, an annular float having an electrically-conducting surface and encircling only one of the members comprising said resistor and said clamping member so as to be freely guided thereby during its rising and falling movements in accordance with the liquid level and means for causing said clamping member to move towards said resistor and thereby bringing said float into electrical contact with said resistor at a point corresponding to the existing liquid level.

3. An electrical indicator for the level of a liquid in a container, comprising in combination, a resistor member fixed in said container so as to extend between the highest and lowest levels to be indicated, a clamping member mounted adjacent and parallel to said resistor, an annular float having an electrically conducting surface and encircling and guided by said resistor and said clamping member so as to be freely guided thereby during its rising and falling movements in accordance with the liquid level and means for causing one of said members to move away from the other member and thereby bringing said float into electrical contact with said resistor at a point corresponding to the existing liquid level.

4. An electrical indicator for the level of a liquid in a container, comprising in combination, a resistor fixed in said container so as to extend between the highest and lowest levels to be indicated, a clamping member mounted adjacent and parallel to said resistor, an annular float having an electrically conducting surface and encircling and guided by said clamping member so as to be freely guided thereby during its rising and falling movements in accordance with the liquid level, and means for causing said clamping member to move towards said resistor and thereby bringing said float into electrical contact with said resistor at a point corresponding to the existing liquid level.

5. An electrical liquid-level indicator, comprising in combination, a resistor mounted so as to extend between the highest and lowest levels to be indicated, a clamping member mounted adjacent and parallel to said resistor, an annular float having an electrically-conducting surface and encircling at least one of the members comprising said resistor and said clamping member so as to be freely guided thereby during its rising and falling movements in accordance with the liquid level, said float having a cross-section approximating a triangle with one point of said triangle being directed towards said resistor, and means for effecting relative transverse movement between said resistor and said clamping member and thereby bringing said float into electrical contact with said resistor at a point corresponding to the existing liquid level.

6. An electrical indicator for the level of a liquid in a container, comprising in combination, a resistor fixed in said container so as to extend between the highest and lowest levels to be indicated, a clamping member mounted adjacent and parallel to said resistor, an annular float having an electrically-conducting surface and encircling said resistor so as to be freely guided thereby during its rising and falling movements in accordance with the liquid level, and means for causing said clamping member to move towards said resistor and thereby bringing said float into electrical contact with said resistor at a point corresponding to the existing liquid level.

WILLIAM THOMAS MARCHMENT.